United States Patent
Witt-ehsani

(10) Patent No.: US 8,606,575 B1
(45) Date of Patent: Dec. 10, 2013

(54) METHOD AND APPARATUS OF PROVIDING SEMI-AUTOMATED CLASSIFIER ADAPTATION FOR NATURAL LANGUAGE PROCESSING

(75) Inventor: Silke Witt-ehsani, Sunnyvale, CA (US)

(73) Assignee: West Corporation, Omaha, NE (US)

( * ) Notice: Subject to any disclaimer, the term of this patent is extended or adjusted under 35 U.S.C. 154(b) by 260 days.

(21) Appl. No.: 13/225,852

(22) Filed: Sep. 6, 2011

(51) Int. Cl.
*G10L 15/26* (2006.01)
*G10L 15/18* (2013.01)
*G10L 15/00* (2013.01)
*G10L 21/00* (2013.01)
*G06F 17/20* (2006.01)
*G06F 17/28* (2006.01)
*G06F 17/21* (2006.01)

(52) U.S. Cl.
USPC .......... 704/235; 704/257; 704/240; 704/243; 704/277; 704/1; 704/4; 704/10

(58) Field of Classification Search
USPC ............ 704/257, 240, 243, 277, 1, 4, 10, 235
See application file for complete search history.

(56) References Cited

U.S. PATENT DOCUMENTS

| | | | |
|---|---|---|---|
| 5,488,652 A * | 1/1996 | Bielby et al. | 379/88.03 |
| 7,031,530 B2 * | 4/2006 | Driggs et al. | 382/228 |
| 7,152,029 B2 * | 12/2006 | Alshawi et al. | 704/1 |
| 7,328,146 B1 * | 2/2008 | Alshawi et al. | 704/1 |
| 7,809,569 B2 * | 10/2010 | Attwater et al. | 704/257 |
| 7,970,615 B2 * | 6/2011 | Attwater et al. | 704/257 |
| 8,321,220 B1 * | 11/2012 | Chotimongkol et al. | 704/257 |
| 8,428,241 B2 * | 4/2013 | Faizakov et al. | 379/211.02 |
| 2002/0022956 A1 * | 2/2002 | Ukrainczyk et al. | 704/9 |
| 2004/0042652 A1 * | 3/2004 | Ii et al. | 382/160 |
| 2004/0042666 A1 * | 3/2004 | Ii et al. | 382/228 |
| 2004/0059697 A1 * | 3/2004 | Forman | 706/46 |
| 2004/0148154 A1 * | 7/2004 | Acero et al. | 704/1 |
| 2004/0204940 A1 * | 10/2004 | Alshawi et al. | 704/240 |
| 2004/0230420 A1 * | 11/2004 | Kadambe et al. | 704/205 |
| 2006/0190253 A1 * | 8/2006 | Hakkani-Tur et al. | 704/243 |
| 2006/0195321 A1 * | 8/2006 | Deligne et al. | 704/257 |
| 2008/0033720 A1 * | 2/2008 | Kankar et al. | 704/235 |
| 2008/0240396 A1 * | 10/2008 | Faizakov et al. | 379/211.02 |
| 2009/0030692 A1 * | 1/2009 | Deligne et al. | 704/257 |
| 2009/0198493 A1 * | 8/2009 | Hakkani-Tur et al. | 704/235 |
| 2012/0010885 A1 * | 1/2012 | Hakkani-Tur et al. | 704/243 |
| 2012/0197640 A1 * | 8/2012 | Hakkani-Tur et al. | 704/235 |
| 2013/0085756 A1 * | 4/2013 | Chotimongkol et al. | 704/243 |

* cited by examiner

*Primary Examiner* — Edgar Guerra-Erazo

(57) ABSTRACT

Example embodiments of the present invention may include a method that provides transcribing spoken utterances occurring during a call and automatically assigning each of the spoken utterances with a corresponding set of first classifications. The method may also include determining a confidence rating associated with each of the spoken utterances and the assigned set of first classifications, and performing at least one of reclassifying the spoken utterances with new classifications based on at least one additional classification operation, and adding the assigned first classifications and the corresponding plurality of spoken utterances to a training data set.

20 Claims, 6 Drawing Sheets

| Data set name | # manual trans | # ASR trans | % Unclassified per baseline |
|---|---|---|---|
| Set 1 | 1318 | 2937 | 11.95% |
| Set 2 | 1731 | 4508 | 11.37% |
| Set 3 | 1661 | 5669 | 10.54% |
| Set 4 | 1331 | 4317 | 9.40% |
| Set 5 | 988 | 3511 | 19.17% |
| Test Set | 1212 | 3071 | 15.2% |
| Total | 8241 | 24013 | 12.4% |

FIG. 3A

| Iteration | Training set size | % Training set size increase | new vocab for adding set 7 | % vocab coverage increase |
|---|---|---|---|---|
| 1 | 39801 | 0% | 116 | 0.0% |
| 2 | 41418 | 4.1% | 107 | 7.8% |
| 3 | 44720 | 12.4% | 105 | 9.5% |
| 4 | 48604 | 22.1% | 100 | 13.8% |
| 5 | 51671 | 29.8% | 96 | 17.2% |

FIG. 3B

| Iteration | % classified with high conf. or exact utterance match | % reduction in unclass. utterances | % Total of automatic classification |
|---|---|---|---|
| 1 | 88.05% | 32.1% | 93.32% |
| 2 | 88.63% | 29.0% | 93.35% |
| 3 | 89.46% | 33.5% | 94.08% |
| 4 | 90.60% | 36.2% | 94.44% |
| 5 | 80.83% | 22.6% | 95.26% |

METHOD AND APPARATUS OF PROVIDING SEMI-AUTOMATED CLASSIFIER ADAPTATION FOR NATURAL LANGUAGE PROCESSING

TECHNICAL FIELD OF THE INVENTION

This invention relates to a method and apparatus of classifying received spoken utterances obtained during a call, and, more particularly, analyzing the spoken utterances and updating the production classifiers frequently to keep the classifications updated.

BACKGROUND OF THE INVENTION

Semi-supervised learning algorithms that utilize both labeled and unlabeled data have been used in text classification work in order to minimize the need to label documents by hand. For the task of classification within the realm of natural language call routing applications, a wide range of different statistical classifiers have been proposed in recent years in order to maximize the classification accuracy and thus the call routing accuracy. Common classifier types include decision tree classifiers, NaïveBayes classifiers, expectation maximization and maximum entropic classifiers. The performance of such classifiers typically depends on the amount of training data available.

Additionally, there has been considerable effort in the area of unsupervised and/or semi-supervised adaption of both language models and call category classifiers. In one example, a boosting algorithm is used to improve a classifier iteratively in order to minimize training error. In another example, multiple classifiers, such as support vector machine, maximum entropy and NaïveBayes, are used to automatically annotate unlabeled data. When all classifiers agreed on a label these utterances were added to the training corpus. In another example it was reported that classification rate may be improved with a classification model that solely utilizes automatic speech recognition (ASR) results as input to the training set as compared to small amounts of transcribed utterances. In a last example, a bootstrapping methodology may be used for semi-automatic annotation using support vector machines.

Practical applications such as automated call centers and commercial spoken dialogue systems need ongoing updates to increase caller satisfaction and higher user response percentages. However the above-noted conventional approaches are limited in scope and do not account for ongoing optimization efforts, recursive iteration procedures and increasing accuracy measures. Conventional commercial spoken dialogue systems include applications that are usually updated as part of formal software package releases. Also, the creation of classification grammars in natural language call routing applications requires expensive manual annotation to update the callers' intents and other information extracted from caller selections or utterances.

SUMMARY OF THE INVENTION

An example embodiment may provide a method that includes transcribing via a processor at least a portion of a plurality of spoken utterances occurring during a call. The method may also include automatically assigning each of the plurality of spoken utterances with a corresponding set of first classifications, determining a confidence rating associated with each of the plurality of spoken utterances and the assigned set of first classifications, and performing at least one of reclassifying the plurality of spoken utterances with new classifications based on at least one additional classification operation, and adding the assigned first classifiers and the corresponding plurality of spoken utterances to a training data set.

Another example embodiment may include an apparatus that includes a receiver configured to receive a plurality of spoken utterances and record them in a database memory. The apparatus also includes a processor configured to transcribe at least a portion of the plurality of spoken utterances occurring during a call, automatically assign each of the plurality of spoken utterances with a corresponding set of first classifications, determine a confidence rating associated with each of the plurality of spoken utterances and the assigned set of first classifications, and perform at least one of reclassify the plurality of spoken utterances with new classifications based on at least one additional classification operation, and add the assigned first classifications and the corresponding plurality of spoken utterances to a training data set.

BRIEF DESCRIPTION OF THE DRAWINGS

FIG. 3A illustrates a table illustrating a reduction in the amount of caller utterances that the production classifier does not know how to classify according to example embodiments of the present invention.

FIG. 3B illustrates a table demonstrating increases in the vocabulary of the production classifier according to example embodiments of the present invention.

DETAILED DESCRIPTION OF THE INVENTION

It will be readily understood that the components of the present invention, as generally described and illustrated in the figures herein, may be arranged and designed in a wide variety of different configurations. Thus, the following detailed description of the embodiments of a method, apparatus, and system, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present invention. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

Figure 1:
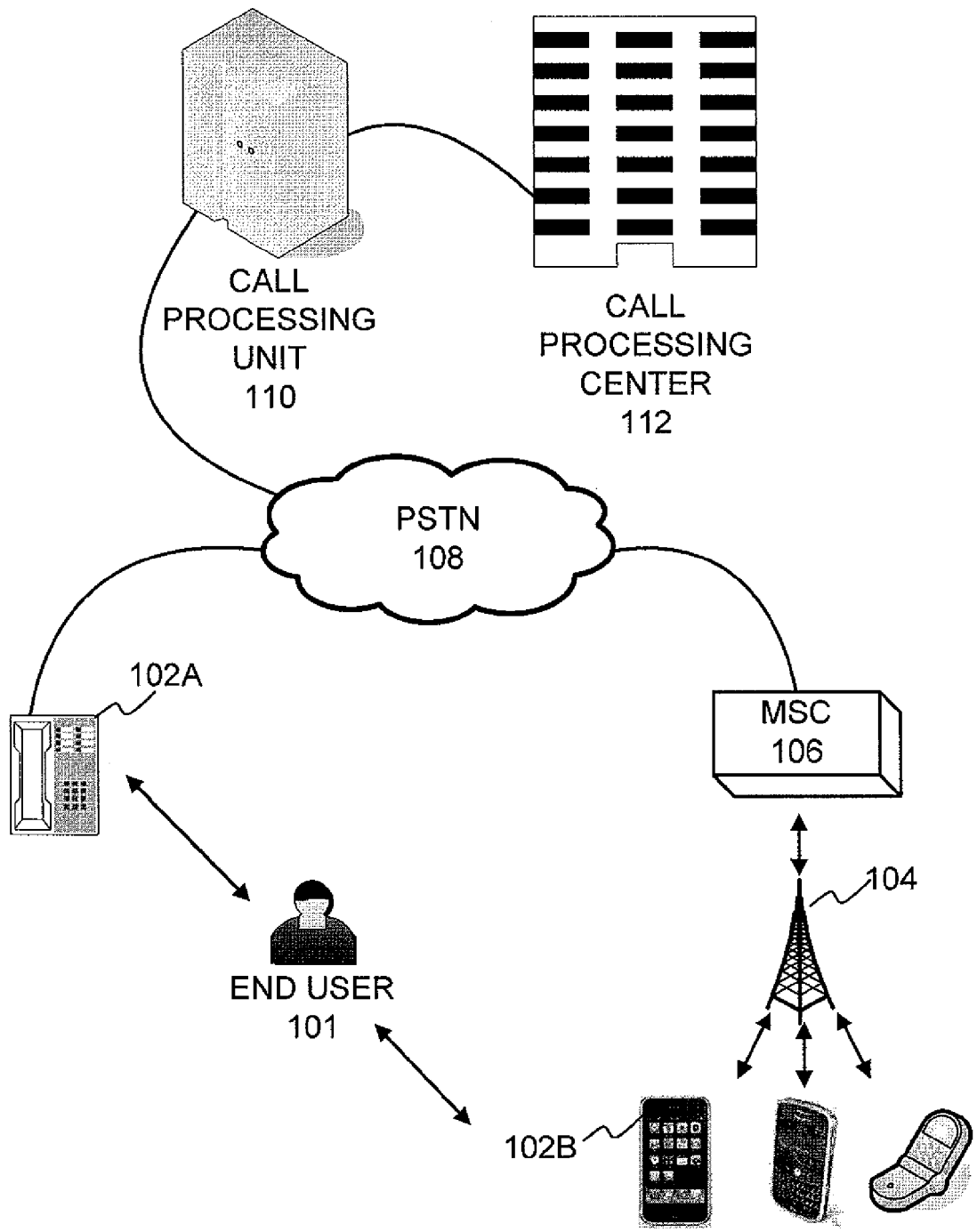
FIG. 1 illustrates an example network configuration according to example embodiments of the present invention.

FIG. 1 illustrates an example communication network according to example embodiments. Referring to FIG. 1, a communication network 100 includes an end user 101 accessing a call processing center 112 via a landline telephone 102A or a mobile station 102B. The landline telephone 102A may communicate over the public switched telephone network (PSTN) 108 to communicate with a call processing unit 110 configured to process a call for a call processing center 112. Alternatively, an end user 101 may conduct a call via a mobile station (e.g., cell phone, smartphone, web-enabled phone, etc.) 102B to a base station 104 and mobile switching center 106, which connects the call to the call processing unit 110 via the PSTN 108. The call processing unit 110 may represent a server(s) that is configured to enable the automated dialog call processing system for a particular call processing center 112.

According to example embodiments of the present invention, a procedure for semi-automatically annotating new data and providing the new annotations to update the training corpus data to continually optimize the classification performance is disclosed. According to one example, multiple classifiers are used in a voting schema to automatically classify an utterance. In addition, a boosting procedure is used to continually update the classifier with the new automatically annotated training data. Such an approach to updating a particular dialogue system may provide a way to update records based on new user initiated spoken utterances by automatic annotation(s). Using an iterative boosting procedure may increase the size of the training corpus by approximately six percent (6%) per call training cycle iteration, while increasing the classification accuracy.

Commercial spoken dialog systems often handle thousands if not tens of thousands of calls a weekly and yet only a minor portion of the data from those calls is analyzed and utilized in order to optimize the performance of such systems. Typically, these types of systems are only periodically updated, perhaps once or twice a year based on an analysis of manual transcriptions and grammar coverage tests.

Common types of commercial spoken dialog systems are call routing or "How may I help you?" type applications that recognize caller spoken utterances such as "I'd like to check my balance" or "I'm missing a channel." These spoken utterances are first recognized with a statistical language model and then the resulting text string is provided to a classifier engine. To update the language model as well as the classifier requires large amounts of manual labor that is expensive and time-consuming and thus tends to only be done when absolutely necessary. For example, the caller utterances are manually transcribed. Next, the transcribed utterances are annotated with the desired target classification, where an "annotation" denotes the process of assigning one of a fixed number of predefined call types to each utterance spoken by a user and recorded by the system. This procedure reduces the amount of manual labor required to update a classifier and to utilize available, live data on a regular basis.

Example embodiments may include a semi-automated approach to adapt a classifier at regular intervals. Examples of regular intervals include weekly or bi-weekly updates, in order to optimize classification performance over time. Also, the frequent updates may provide optimum performance levels when changes in caller patterns occur. Confidence information of the main production classifier may be calculated to guide the automated reclassification with additional classifiers. Further, iterative classifier updates may be implemented in a commercial production environment in order to increase coverage and accuracy of a classifier over time. This procedure ensures that the performance of a classifier does not decrease over time due to a mismatch between live data and training data, since call related "reasons" and their relative "frequency" tend to change over time.

One example of automatic classification may be performed via multiple classifiers. The purpose of utterance classification in a call routing system is to assign a call category (i.e., annotation or classification) with a confidence score so that the pair $<F,c_j> \in F \times C$ is created, where F is the set of features extracted from the spoken utterance u, and C is a predefined set of call categories. The use of multiple classifiers may optimize the overall classifier performance since different classifiers have different attributes and strengths. Three different procedures for classifier combinations are described below. A first example provides combining the classifier outputs in a weighted combination. The second example applies a top learner algorithm, such, as a decision tree, to decide on a call category. In the third example, a cascading approach is used.

According to another example embodiment, a combination of a multi-classifier approach is used with the 'NBest' results list of a primary classifier. This approach provides transcribing utterances to be classified with an existing production classifier. The correct annotation is in the top 3 'NBest' results for 96% of all utterances. Each 'NBest' result is associated with a classification confidence, with the top result, NBest1 having the highest confidence value, NBest2 having the second highest confidence value and NBest3 having the third highest confidence value. Nbest=3 denotes the top three highest confidence values results.

Classification accuracy may be high for common phrases that occur frequently. Classification errors occur for phrases with unknown vocabulary or rarely used ways of describing call reasons. As a result, one example procedure may include an automatic classification of low confidence utterances.

One example embodiment may include a production classifier procedure approach to calculating a classifier. This example utilizes a decision tree-based classifier. This classifier has been trained on 10,420 unique caller utterances that had been manually transcribed and then manually annotated with one of 45 categories. This amount of training data resulted in a classifier with a baseline classification accuracy of 85.3%. For each utterance classification, the classifier returns a NBest list of 3 results together with their respective confidence. Instead of using 3 results, another example embodiment may increase the size of the NBest list to any number "N." NBest=3 was selected for example purposes only.

Another example embodiment may include a NaïveBayes classifier used as a supporting classifier as part of the production classifier update procedure. This example utilizes a NaïveBayes classifier. This classifier is based on the NaïveBayes algorithm which uses the Bayes rule to express $P(c_i|F)$ in terms of $P(c_i)$ and $P(F|c_i)$, which results in:

$$P(c_i|F) = \frac{P(c_i)P(F|c_i)}{P(F|c_i)}. \quad (1)$$

This classifier is called 'naïve' because of the 'naïve' assumption that all features are independent, given a particular category. According to one example, the Python NL Toolkit was used to train a NaïveBayes classifier with unigram, bigram and trigram features. Before inputting the training data to the classifier, all utterances were stemmed using the 'WordNetLemmatizer' feature. The accuracy of this type of classifier on a test set would be approximately 85%.

Another example embodiment may include a decision tree classifier approach to calculating a classifier. This example utilizes a decision tree classifier. This classifier is used as a classifier model to determine which category to assign to a caller utterance, it utilizes a tree structure where the branches correspond to conditions on feature values, and leaves correspond to category assignments. A classification begins at the initial decision node known as a root node. Each node contains a condition that checks the match of the test utterances against the feature set. Experiments with different feature sets, provided that the greatest performance was for a feature that included a combination of unigrams, bigrams and trigrams. The accuracy of this classifier on a test set would be approximately 86%.

Another example embodiment may include a multi-classifier reclassification procedure approach to calculating a classifier. In this example, the auto-classification algorithm presented here is based on the assumption that different classifiers will make different kinds of errors. From the production classifier, the 3-NBest classification results are available for reclassification. Assuming a confidence threshold of 0.6, the classification error rate (CER) of the production classifier becomes small, such as less than (<) 2%. As a result, high confidence classification results are assumed to be correct and not further reclassified. Low confidence utterances are reclassified based on additional information from the NaïveBayes and decision tree classifiers.

For the multi-classifier reclassification example, let $C_{Reclass}(u_i)$ be the reclassification of an utterance $u_i$, then the reclassification rule can be described as:

$$C_{Reclass}(u_i) = \begin{cases} C_{Tree}(u_i) & \text{if } \begin{cases} C_{Tree}(u_i) = C_{Bayes}(u_i) \\ \text{AND} \\ C_{Tree}(u_i) = C_{nbest1,2 \text{ or } 3}(u_i) \end{cases} \\ \text{reject classification} & \text{otherwise.} \end{cases} \quad (2)$$

In other words, the multiple classifier voting rule for low confidence classification results is that if both NaïveBayes and the decision tree computations result in the same classification and if this classification matches one of the 3-NBest production classifications, then assign this classification to the utterance. This reclassification process is entirely automated, but assumes manual transcription of utterances with low confidence recognition results in order to avoid recognition error propagation.

According to example embodiments of the present invention, an iterative classifier update process provides that when a classifier is being created, it is only as valid as the training data available. Ideally, a classifier would continually be updated with learning data from often thousands of daily calls such systems tend to receive. In order to put a continuous learning and update process in place, a requirement may be to add new utterances and associated classifications into the classifier database with minimal human intervention.

In general 'classification' is the natural language (NL) tag that is assigned to a caller utterance. For example, if the caller says 'I want to pay my bill by credit card' the classification is 'payByCreditCard.' If the caller says 'I need a new cable box' the classification would be 'addABox'. In other words, each NL or call routing application has a predefined (i.e. agreed upon with the client) set of classifications often denoted tags or destinations. Then each caller utterance needs to be assigned to one of these classifications. The application then is coded to know what to do with a caller that is assigned a classification. In the bill pay example, the call would be transferred to a bill payment application.

Figure 2:
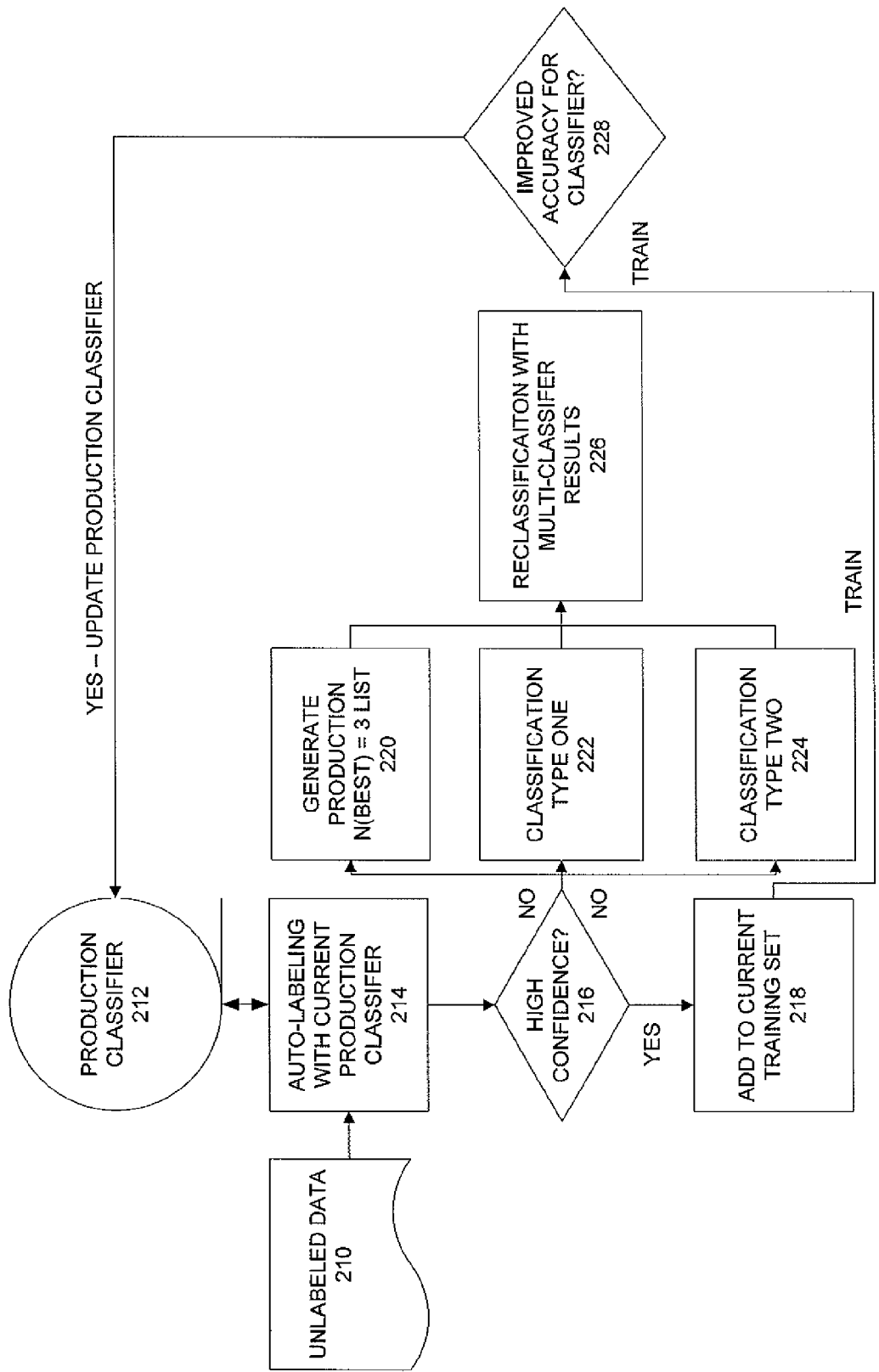
FIG. 2 illustrates a flow diagram according to example embodiments of the present invention.

FIG. 2 illustrates an example flow diagram of an algorithm used to perform an iterative, automated classifier update cycle. Referring to FIG. 2, the component that requires manual intervention is the transcription process of low ASR (automatic speech recognition) confidence utterances.

Assuming a regular update interval of a few days or weeks, the procedure may include beginning with a default or original production classifier value at operation 212. All rejected, low confidence or disconfirmed utterances for the given time interval are transcribed. Unlabeled data that is received at operation 210 responsive to caller transactions may be automatically labeled with a current production classifier at operation 214. Next, it is determined whether the confidence levels of the automatic confidence assignments are high at operation 216. If so, the assignments are added to the current training set at operation 218. The improved accuracy for the classifier is confirmed for a new training cycle at operation 228 and the updated production classifier cycle is repeated. If not, a series of classification procedures may be performed. For example, an NBest-3 list is generated at operation 220. Additionally, a first classification type may be performed followed by a second classification type at operations 222 and 224. A reclassification may be performed at operation 226 to incorporate multi-classifier results from operations 220-224. The update procedure changes the existing production classifier. A classifier is defined by a set of statistics on which word pairs, trigrams, etc. to expect for a given destination or classification or tag. The classifiers definition would change during the updating procedure.

As indicated above with reference to FIG. 2, the manual data with high confidence ASR recognition utterances may be merged and all utterances with the production classifier using a NBest=3 approach are classified. A low confidence classification result is reclassified with the NaïveBayes and decision tree classification results, and an update production classifier operation is performed with auto-classified utterances. The process may be re-started once the classification and reclassification operations are completed.

The above-noted implementations and algorithms on both coverage and classification accuracy that were achieved yielded a total of 24,013 utterances had been collected over a six week time period. The data was separated into six data segments. The last data set was held out from the training data and used as a test set for this experiment. While the production classifier had higher accuracy on common utterances such 'I have no cable', both the recognition accuracy and the classification of longer utterances was lower.

FIG. 3A illustrates after an initial auto-classification only about approximately 12.4% of the data remains unlabeled on average by either finding an exact match of an (stemmed) utterance in the training set or by having a high confidence classification with the baseline classifier. Referring to FIG. 3A, table 310 illustrates a data set name, a number of manual transcriptions, a number of ASR transcriptions and a percent of unclassified utterances per baseline ranging from 9 to 19 percent. Note, that since the focus of this analysis was on broadening and expanding the coverage of the classifier, only 50% of the high confidence utterances were combined with the manually transcribed low confidence utterances. That way, a bias towards less common utterances was introduced. Given these datasets, the iterative auto-classification and classifier update process was applied to the 5 datasets and the performance was measured against the hold-out test set.

FIG. 3B illustrates another table 320 which represents a training set and vocabulary coverage increase due to iterative auto-classification. Referring to FIG. 3B, table 320 illustrates the results of this process with regard to coverage. The coverage increase is described by both the overall increase in the training set as well as the increase in the vocabulary. As can be seen from the results in table 320, with each iteration, a small set of new vocabulary is added with the result that in the future a higher percentage of the vocabulary is known based on recent utterances.

Figures 4A, 4B:
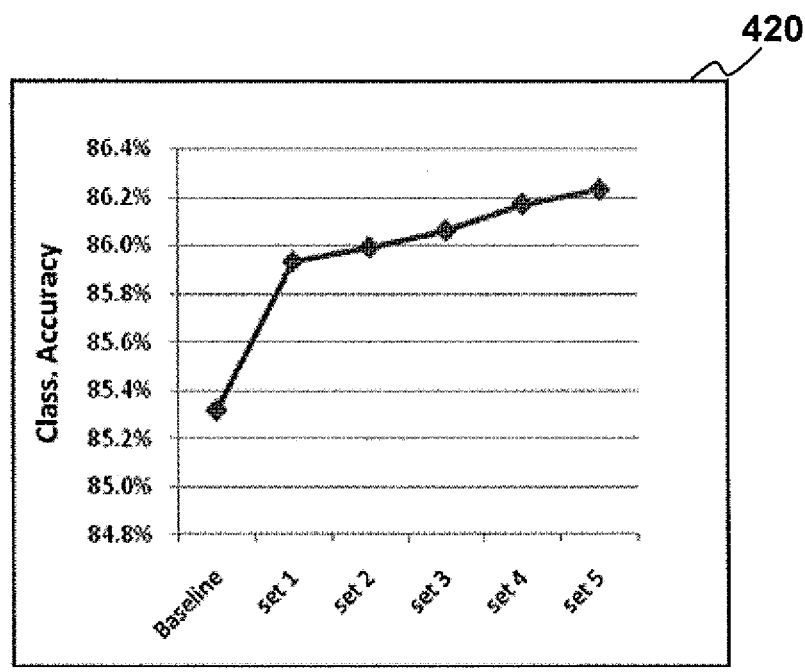
FIG. 4A illustrates a table demonstrating an increase in the classification success of the production classifier according to example embodiments of the present invention.
FIG. 4B illustrates a graph according to example embodiments of the present invention.

FIG. 4A illustrates a table representing the impact of the iterative multi-classifier boosting approach on the classification percentage as well as the classification error rate. Referring to FIG. 4A, table 410 illustrates on average, that the multi-classifier reclassification results in a 30% reduction of the low-confidence classification results of, the production classifier for each iteration (i.e., see column 3 of table 410). The results translate to an absolute classification rate increase of about 5%. Table 410 also illustrates that with the boosting approach, on average, 94% of all utterances can be classified automatically, leaving only a handful of utterances for manual review.

FIG. 4B illustrates a graph indicating an increase in classification accuracy with each iteration. Referring to FIGS. 4A and 4B, the data from both table 410 and graph 420 illustrate that the added coverage to the training set does not reduce that accuracy. Graph 420 illustrates a classification accuracy increase with more iterations of an updated classifier with auto-classified data.

Examples included in this disclosure provide algorithms that may be used to continually update and optimize the classification performance of a natural language call routing application where the manual effort is limited to transcribing utterances with low ASR confidence values. It was shown that with this approach, more than 93% of all utterances can be classified and used to update a production classifier on an ongoing basis to provide frequent and simple updating procedures for increased customer satisfaction with automated and voice recognition call processing systems.

Figure 5:
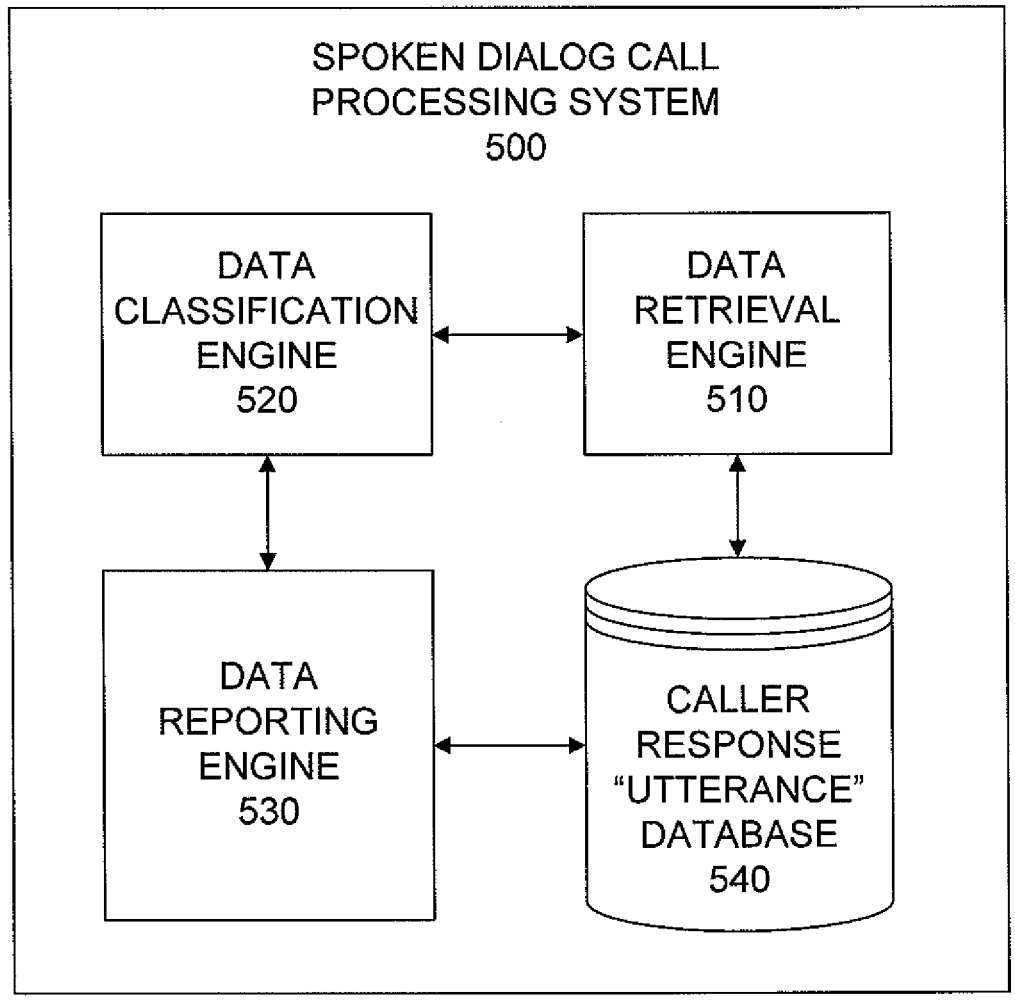
FIG. 5 illustrates a system diagram of a network entity configured to provide one or more operations related to the example embodiments of the present invention.

FIG. 5 illustrates an example system configuration of an apparatus configured to perform a set of operations based on one or more of the above-noted embodiments of the present invention. Referring to FIG. 5, a spoken dialog call processing system 500 may include a caller response database 540 that stores the recognized user spoken utterances. The system 500 also includes a data retrieval engine 510, a data classification engine 520 and a data reporting engine 530.

With reference to FIG. 5, the system 500 may perform receiving a number of user spoken utterances in response to automated questions presented to the user during the course of a phone call. The system may receive the utterances, record them and store them in a database 540. The system 500 may also perform transcribing via a processor of data reporting engine 530 at least a portion of the spoken utterances which occurred during the call. The system 500 may also automatically assign each of the plurality of spoken utterances with a corresponding set of first classifications via the data classification engine 520. Next, the system 500 may perform determining a confidence rating associated with each of the plurality of spoken utterances and the assigned set of first classifications, and perform at least one of reclassifying the plurality of spoken utterances with new classifiers based on at least one additional classification operation, and adding the assigned first classifications and the corresponding plurality of spoken utterances to a training data set.

The transcribed portion of the plurality of spoken utterances may include those utterances which were rejected spoken utterances, low confidence rated spoken utterances and disconfirmed spoken utterances that the system did not accept. If the confidence rating associated with each of the plurality of spoken utterances produces confidence ratings that are above a predefined confidence threshold (e.g., 80%) then the automatically labeled plurality of spoken utterances may be added to the training data set without further processing. If however, the determined confidence ratings associated with each of the plurality of spoken utterances produces confidence ratings that are below the predefined threshold (e.g., 80%) then the plurality of spoken utterances may be reclassified with new classifiers based on at least two different classification operations.

Examples of the classification operations and the reclassification procedure may include at least two different classification operations, such as generating a list of the three highest classification confidence levels among the plurality of utterances, performing a Naïve-Bayes classification operation on the plurality of spoken utterances, and performing a decision tree classification on the plurality of spoken utterances.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 6 illustrates an example network element 600, which may represent any of the above-described network components of the other figures.

Figure 6:
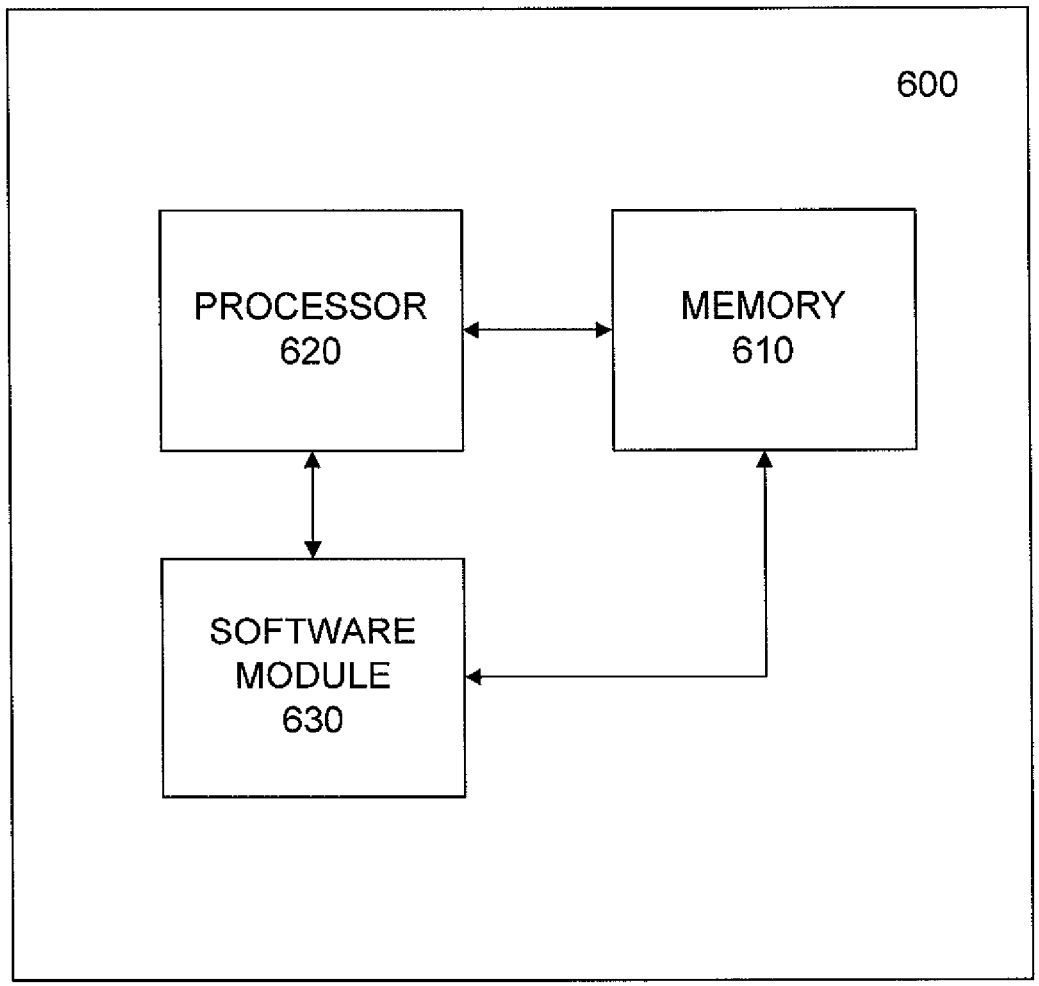
FIG. 6 illustrates a network entity that may include memory, software code and other computer processing hardware, and which may be configured to perform operations according to example embodiments of the present invention.

As illustrated in FIG. 6, a memory 610 and a processor 620 may be discrete components of the network entity 600 that are used to execute an application or set of operations. The application may be coded in software in a computer language understood by the processor 620, and stored in a computer readable medium, such as, the memory 610. Furthermore, a software module 630 may be another discrete entity that is part of the network entity 600, and which contains software instructions that may be executed by the processor 620. In addition to the above noted components of the network entity 600, the network entity 600 may also have a transmitter and receiver pair configured to receive and transmit communication signals. (not shown).

While preferred embodiments of the present invention have been described, it is to be understood that the embodiments described are illustrative only and the scope of the invention is to be defined solely by the appended claims when considered with a full range of equivalents and modifications (e.g., protocols, hardware devices, software platforms etc.) thereto.

What is claimed is:

1. A method, comprising:
transcribing via a processor at least a portion of a plurality of spoken utterances occurring during a call;
automatically assigning each of the plurality of spoken utterances with a corresponding set of first classifications;
determining a confidence rating associated with each of the plurality of spoken utterances and the assigned set of first classifications; and
performing at least one of
reclassifying the plurality of spoken utterances with new classifications based on at least one additional classification operation, and
adding the assigned first classifications and the corresponding plurality of spoken utterances to a training data set.

2. The method of claim 1, wherein the plurality of spoken utterances are user spoken utterances responsive to automated questions presented to the user during the call.

3. The method of claim 1, wherein the transcribed at least a portion of the plurality of spoken utterances comprises at least one of rejected spoken utterances, low confidence rated spoken utterances and disconfirmed spoken utterances.

4. The method of claim 1, wherein if the determining the confidence rating associated with each of the plurality of spoken utterances produces confidence ratings that are above a predefined threshold then adding the labeled plurality of spoken utterances to the training data set.

5. The method of claim 1, wherein if determining the confidence rating associated with each of the plurality of spoken utterances produces confidence ratings that are below a predefined threshold then reclassifying the plurality of spoken utterances with new classifications based on at least two different classification operations.

6. The method of claim 5, wherein the at least two different classification operations comprise at least one of generating a list of the three highest classification confidence levels among the plurality of utterances, performing a Naïve-Bayes classification operation on the plurality of spoken utterances, and performing a decision tree classification on the plurality of spoken utterances.

7. The method of claim 1, further comprising:
updating a production classifier used to perform classification operations by adding the new classifications to a database; and
repeating the transcribing, via the processor, of the at least a portion of the plurality of spoken utterances occurring during the call;
repeating the automatic assigning of each of the plurality of spoken utterances with the corresponding set of first classifications;
repeating the determining of the confidence rating associated with each of the plurality of spoken utterances and the assigned set of first classifications; and
repeating the performing of the at least one of the
reclassifying the plurality of spoken utterances with the new classifications based on the at least one additional classification operation, and
adding the assigned first classifications and the corresponding plurality of spoken utterances to the training data set.

8. An apparatus, comprising:
a receiver configured to receive a plurality of spoken utterances and record them in a database memory; and
a processor configured to
transcribe at least a portion of the plurality of spoken utterances occurring during a call,
automatically assign each of the plurality of spoken utterances with a corresponding set of first classifications,
determine a confidence rating associated with each of the plurality of spoken utterances and the assigned set of first classifications, and
perform at least one of
reclassify the plurality of spoken utterances with new classifications based on at least one additional classification operation, and
add the assigned first classifications and the corresponding plurality of spoken utterances to a training data set.

9. The apparatus of claim 8, wherein the plurality of spoken utterances are user spoken utterances responsive to automated questions presented to the user during the call.

10. The apparatus of claim 8, wherein the transcribed at least a portion of the plurality of spoken utterances comprises at least one of rejected spoken utterances, low confidence rated spoken utterances and disconfirmed spoken utterances.

11. The apparatus of claim 8, wherein if the determined confidence ratings associated with each of the plurality of spoken utterances produces confidence ratings that are above a predefined threshold then the processor is configured to add the labeled plurality of spoken utterances to the training data set.

12. The apparatus of claim 8, wherein if the determined confidence rating associated with each of the plurality of spoken utterances produces confidence ratings that are below a predefined threshold then the processor is configured to reclassify the plurality of spoken utterances with new classifications based on at least two different classification operations.

13. The apparatus of claim 12, wherein the at least two different classification operations comprise the process performing at least one of generating a list of the three highest classification confidence levels among the plurality of utterances, performing a Naïve-Bayes classification operation on the plurality of spoken utterances, and performing a decision tree classification on the plurality of spoken utterances.

14. A non-transitory computer readable storage medium configured to store instructions that when executed cause a processor to perform:
transcribing via a processor at least a portion of a plurality of spoken utterances occurring during a call;
automatically assigning each of the plurality of spoken utterances with a corresponding set of first classifications;
determining a confidence rating associated with each of the plurality of spoken utterances and the assigned set of first classifications; and
performing at least one of
reclassifying the plurality of spoken utterances with new classifications based on at least one additional classification operation, and
adding the assigned first classifications and the corresponding plurality of spoken utterances to a training data set.

15. The non-transitory computer readable storage medium of claim 14, wherein the plurality of spoken utterances are user spoken utterances responsive to automated questions presented to the user during the call.

16. The non-transitory computer readable storage medium of claim 14, wherein the transcribed at least a portion of the plurality of spoken utterances comprises at least one of rejected spoken utterances, low confidence rated spoken utterances and disconfirmed spoken utterances.

17. The non-transitory computer readable storage medium of claim 14, wherein if the determining the confidence rating associated with each of the plurality of spoken utterances produces confidence ratings that are above a predefined threshold then adding the labeled plurality of spoken utterances to the training data set.

18. The non-transitory computer readable storage medium of claim 14, wherein if the determining the confidence rating associated with each of the plurality of spoken utterances produces confidence ratings that are below a predefined threshold then reclassifying the plurality of spoken utterances with new classifications based on at least two different classification operations.

19. The non-transitory computer readable storage medium of claim 18, wherein the at least two different classification operations comprise at least one of generating a list of the three highest classification confidence levels among the plurality of utterances, performing a Naïve-Bayes classification operation on the plurality of spoken utterances, and performing a decision tree classification on the plurality of spoken utterances.

20. The non-transitory computer readable storage medium of claim 14, wherein the processor is further configured to perform:
   updating a production classifier used to perform classification operations by adding the new classifications to a training database; and
   repeating the transcribing, via the processor, of the at least a portion of the plurality of spoken utterances occurring during the call;
   repeating the automatic assigning of each of the plurality of spoken utterances with the corresponding set of first classifications;
   repeating the determining of the confidence rating associated with each of the plurality of spoken utterances and the assigned set of first classifications; and
   repeating the performing of the at least one of the
      reclassifying the plurality of spoken utterances with the new classifications based on the at least one additional classification operation, and
      adding the assigned first classifications and the corresponding plurality of spoken utterances to the training data set.

* * * * *